United States Patent [19]

Nickerson et al.

[11] Patent Number: 4,566,030
[45] Date of Patent: Jan. 21, 1986

[54] TELEVISION VIEWER DATA COLLECTION SYSTEM

[75] Inventors: Rand B. Nickerson, Scarborough; Russell J. Welsh, Toronto, both of Canada

[73] Assignee: CTBA Associates, Cincinnati, Ohio

[21] Appl. No.: 502,654

[22] Filed: Jun. 9, 1983

[51] Int. Cl.[4] .............................................. H04N 7/00
[52] U.S. Cl. ..................... 358/84; 179/245; 455/2
[58] Field of Search ........... 179/2 AS, 2 AM; 358/84; 455/2, 4, 5

[56] References Cited

U.S. PATENT DOCUMENTS

| | | | |
|---|---|---|---|
| 3,639,686 | 2/1972 | Walker et al. | 455/4 X |
| 3,651,471 | 3/1972 | Haselwood et al. | 455/2 X |
| 3,987,397 | 10/1976 | Belcher et al. | 455/2 |
| 4,025,851 | 5/1977 | Haselwood et al. | 455/2 |
| 4,104,486 | 8/1978 | Martin et al. | 179/2 AM |
| 4,241,237 | 12/1980 | Paraskevakos et al. | 179/2 AM |
| 4,258,386 | 3/1981 | Cheung | 358/84 |
| 4,308,554 | 12/1981 | Perly et al. | 358/84 |
| 4,331,973 | 5/1982 | Eskin et al. | 358/84 |
| 4,331,974 | 5/1982 | Cogswell et al. | 358/84 X |
| 4,361,851 | 11/1982 | Asip et al. | 358/84 |
| 4,404,586 | 9/1983 | Wright, Jr. | 455/4 X |
| 4,455,570 | 6/1984 | Saeki et al. | 455/4 X |

FOREIGN PATENT DOCUMENTS

| | | | |
|---|---|---|---|
| 2404074 | 8/1975 | Fed. Rep. of Germany | 358/84 |
| 1536414 | 12/1978 | United Kingdom | 358/84 |

Primary Examiner—Keith E. George
Attorney, Agent, or Firm—Cushman, Darby & Cushman

[57] ABSTRACT

A data storage and transmission system is provided for accumulating and transmitting data from a plurality of remote T.V. panelist locations to a central location. Each remote unit includes a microprocessor, a control memory, and a data store memory. The control memory stores control information for the remote unit, which may include dynamic allocation information. The data store memory is event driven and stores data as to television channel selection and times thereof, and can store viewer reaction data and the like. At a preselected time, each remote unit initiates a telephone call to a central location and identifies itself. Upon successful telephone connection between a remote unit and the central location, any data such as viewer habit and/or reaction data and the like contained in the data store memory is transmitted over the telephone line to the central location.

4 Claims, 7 Drawing Figures

TELEVISION VIEWER DATA COLLECTION SYSTEM

BACKGROUND OF THE INVENTION

The present invention relates to data storage and transmission systems and more particularly relates to monitoring systems for accumulating data at remote locations and transmitting the data to a central location. More particularly, the present invention is particularly intended for use as a television receiver monitoring system for collecting data relative to viewing habits and viewing preferences of television viewers and for transmitting the data to a central location. In accordance with one embodiment the present invention also relates to a system in which individual television receivers may be controlled to display substitute programming.

The prior art is replete with various systems and arrangements for monitoring viewing habits of television viewers. The earliest such systems merely collected data on site for eventual manual collection as to the T.V. channels viewed and the times of viewing for determining market share and ratings of various television programs. Later, systems came into being for use with cable T.V. systems with two way communications over the cable system. Typically on such a system the television sets are interrogated periodically from the central location over the cable with the channel and time information being sent back to the central location and logged for statistical compilation. Such systems have also been used in the past in so-called pay T.V. systems in which billing information is sent over the cable system to a central location. The prior art also includes such systems in which a memory means is provided at the remote location, i.e., television receiver, for accumulating data as to channel being viewed and time. The accumulated data is then transmitted over conventional telephone lines from the remote locations to the central location, by telephone calls initiated by either the remote stations or the central location.

Presently, systems for remotely accumulating data regarding the habits of television viewers and their qualitative reaction to material has become important from the standpoint of market research. For example, the effectiveness of television commericals can be monitored by correlating viewing of those commercials with subsequent purchase decisions made by panelists whose viewing habits are being monitored. One manner of achieving this is to have the cooperating panelists keep a diary as to purchase of products. Alternatively, in areas where universal product code automated checkouts are available, such as grocery stores and the like, a consumer makes his or her purchases and at the checkout counter presents a card coded with a unique scanner i.d. similar to the universal product code symbol on the products purchased. The store's computer can automatically retain such purchase data for subsequent transfer to a market research company computer data base for correlation with the data regarding that purchasers viewing of commercials.

In market research relating to commercials and their effectiveness, it also is sometimes important to evaluate the effectiveness of alternate forms of a commercial. One way of achieving this in the context of a cable T.V. system is to split the subscribers or panelists into two or more groups, and then show alternate commercials to the various groups. Correlation of the purchase information regarding those panelists with the commercials they viewed then can be used to assess the effectiveness of the various forms of the commercial. Systems have also been proposed in which, in the context of a cable T.V. system, substitute programming i.e., alternate forms of commercials, can be effected at selected of the subscribers television sets by control information transmitted over the cable, including the addresses of the particular subscriber remote locations which are to receive the alternate programming.

The present invention relates to an improved system and method which is of particular utility in market research type applications, but which is not limited thereto.

OBJECTS AND SUMMARY OF THE INVENTION

It is an object of the present invention to provide a system and method for remote monitoring of television viewer habits and/or viewer reactions.

It is another object of the present invention to provide such a system and method in which each remote unit is provided with an event driven memory for collecting data regarding viewer habits and/or viewer reactions.

It is another object of this invention to provide such a system and method which, in accordance with one embodiment is not limited to use in a cable television system.

It is another object of this invention to provide such a system and method in which control information for controlling the remote unit is communicated from a central location over non-dedicated telephone lines.

It is still another object of this invention to provide such a system and method in which viewer habit and/or viewer reaction data accumulated in memory at the remote units is periodically communicated to a central location over non-dedicated telephone lines.

It is still another object of this invention, in accordance with one embodiment, to provide such a system and method in which substitute program control information, is stored in memory at the remote locations for achieving dynamic allocation of programming material for each of the remote units.

Briefly, in accordance with one embodiment of the invention, a remote unit is provided at each of a plurality of panelist locations. The remote unit is adapted to be connected to one or more television sets at each panelist location, or to a cable television converter in the context of a cable television system. Each remote unit has a suitable modem for coupling the unit to a non-dedicated telephone line at each panelist location. Each remote unit includes a microprocessor, a control memory, and a data store memory. The control memory stores control information for the remote unit, which may include dynamic allocation information. The data store memory is event driven and stores data as to television channel selection and times thereof, and can store viewer reaction data and the like. At a preselected time, each remote unit initiates a telephone call to a central location and identifies itself. Upon successful telephone connection between a remote unit and the central location, any data such as viewer habit and/or viewer reaction data and the like contained in the data store memory is transmitted over the telephone line to the central location. The central location in turn can transmit new control information to each remote unit, which may include dynamic allocation information, for storage at the remote unit for controlling the remote unit until the time of next communication of the remote unit with the central location.

A viewer control is associated with each television set or cable television converter coupled to the remote unit. The viewer control includes a television channel selector and a switch actuatable between channel lock and non-channel lock positions. When the switch is in the channel lock position, the television set stays tuned to whatever channel was previously selected, but subsequent changes in the channel selector are stored in the data store memory. This feature is useful for recording data relating to viewer response, individual viewer identification and the like.

Other objects, features and advantages of the present invention in its various embodiments will appear from the detailed description thereof taken in conjunction with the accompanying drawings.

BRIEF DESCRIPTION OF THE DRAWINGS

FIG. 3 is a block diagram of an alternate embodiment of the invention in which data is tranferred to a cassette recorder or the like.

DETAILED DESCRIPTION OF THE PREFERRED EMBODIMENTS

Figure 1:
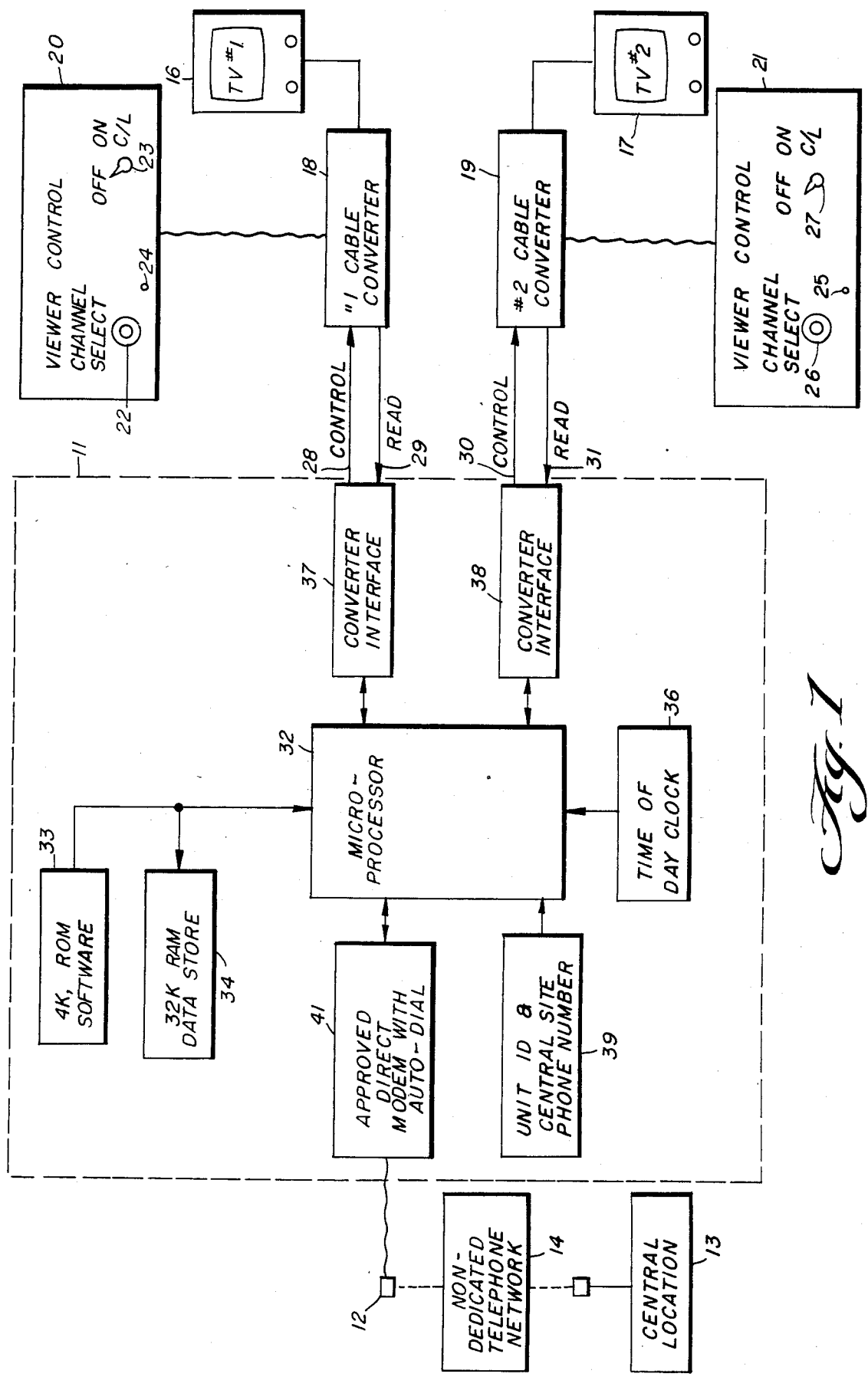
FIG. 1 is a block diagram of a remote unit in accordance with the present invention, illustrating its interconnection to cable television converters at a panelist location.

Referring now to FIG. 1, there is shown a functional block diagram of a television viewer data collection system in accordance with the present invention. In functional terms, a system in accordance with the present invention includes a number of remote data acquisition systems, located in selected cooperating households, monitoring the television viewing occurring there. This information is passively collected and recorded along with a precise time of occurrence. At a pre-programmed time, the remote unit telephones a central site and transmits the data that has been collected i.e., during the preceding twenty-four hours. Each remote unit contains a unique i.d. number by which it is identified by the central site.

Turning to FIG. 1, there is illustrated a remote unit 11 connected to a telephone jack 12. A central location 13 is provided for receiving data from the remote units and connection to the central location is via the nondedicated telephone network generally indicated by reference numeral 14.

Each of the remote units 11 can monitor activity on one or more television broadcast receivers. In the embodiment of the invention illustrated in FIG. 1, the remote unit 11 is shown as monitoring activity on two television broadcast receivers 16 (t.v. #1) and 17 (t.v. #2). In the embodiment of the invention illustrated in FIG. 1, the system is shown as utilized in the context of a cable television system with there being provided a number 1 cable converter 18 and a number 2 cable converter 19 for the respective television broadcast receivers 16 and 17. These cable converters represent a means for receiving television broadcast signals and applying them to the television broadcast receivers. Although in accordance with the preferred embodiment of the invention the data acquisition system is applied in the context of a cable television system, the invention is not so limited. That is, instead of the cable converters 18 and 19, an antenna system could be provided for receiving television broadcast signals.

In the embodiment of the invention illustrated in FIG. 1, a viewer control 20 and 21 is associated with each of the cable converters 18 and 19. Each of the viewer control units is equipped with certain features. Thus, viewer control unit 20 has a channel select switch 22, an additional switch 23 which can be actuated between off, on, and channel lock positions, and a light emitting diode 24. Similarly, the viewer control unit 21 has a channel select switch 26, an additional switch 27 which can be actuated between off, on, and channel lock positions, and a light emitting diode 25.

Each of the cable converter units is coupled to and under the control of the remote unit 11. This is illustrated in FIG. 1 by the control and read signal lines 28 and 29 interconnecting the remote unit 11 with cable converter 18, and the control and read signal lines 30 and 31 interconnecting the remote unit 11 with the cable converter 19.

Turning now to the remote unit 11, the heart of the remote unit is a microprocessor 32. First memory means, which can be a 4K ROM memory 33 is provided interconnected with the microprocessor and stores the software programming information for the microprocessor. A second memory means which can be in the form of a 32K RAM 34 is provided interconnected with the microprocessor 32 for data storage. A suitable timing means such as time of day clock 36 is provided for inputting to the microprocessor 32 precise time of day information. The microprocessor 32 is interconnected with the control and read lines 28 and 29 for cable converter 18 through a converter interface 37. Similarly, the microprocessor 32 is interconnected to the control and read signal lines 30 and 31 of cable converter 19 by a converter interface 38. A switch register 39 is provided for inputting to the microprocessor 32 unit i.d. numbers and the telephone number of the central site or location. A suitable modem 41 is provided coupled to the microprocessor 32 and under control of the microprocessor 32 for effecting communication with the central location 13 through the nondedicated telephone network under control of the microprocessor 32.

In operation, the system in accordance with this invention and as functionally illustrated in FIG. 1 is programmed to collect all changes in converter state along with the time of occurrence. A cable converter state is defined to be the converter turned on with the tuning selector stationary on one channel for a minimum length of time or the converter being turned off. The system stores the data describing the event each time the converter state of cable converter 18 or 19 changes. The data saved is the new cable converter channel and the time of the change. If the converter is turned off then the channel number that is saved is zero. The system in accordance with programming in the ROM 33 always makes also an entry in the collected data at midnight to resolve any potential discrepancies involving the date that an event occurred. The 32K RAM memory 34 is sufficient for storing on the order of 10,000 events of collected data.

The remote unit is generally in a loop monitoring three items, these being the state of the cable converter 18 or 19, the time of day, and the contents of the switch register 39. While in this mode, the unit will collect and store all changes of converter state until the 32K RAM memory 34 is filled. The time of day is monitored to determine if a preselected call-in time has been reached. Each of the remote units has a unique call-in time that is preset in accordance with a unit i.d. number set in the switch register 39. When the preselected call-in time is reached, the microprocessor 32 effects communication through the modem 41 and the nondedicated telephone network 14 to the central location 13.

In the call-in procedure, it takes approximately 22 seconds for the remote unit to dial a number. Transmitting 15 kilobytes of data at 1200 baud from the memory 34 will require approximately 130 seconds. Approximately an additional five seconds is allowed for some system handshaking. Each of the units has a unique call-in time which is determined by the unit i.d. number stored in switch register 39. In accordance with one embodiment of the invention, programming in the first memory means 33 is such that an overall system call-in window is set to start at 2:00 a.m. Then, allowing 3 minutes for each of the remote units to effect communication and unload data to the central location, station 1 will call 3 minutes after the beginning of the call-in window; station 2 will call in at 6 minutes after the beginning of the window; and so on.

When the time of day as determined by the time of day clock 36 reaches the call-in time of the particular remote unit, the microprocessor 32 will attempt to telephone the central site through modem 41. It will effectively lift the telephone receiver, dial the central site phone number stored in switch register 39 and wait for the central site modem to answer the call. If the remote unit fails to make a successful connection with the central site, programming is such that it will hang up, wait 16 seconds and then try once more. If it fails on the second attempt, the unit will reenter the normal monitoring mode after changing the call in time to two hours later than the local time. There are a variety of reasons why successful telephone connection may not be made. The central site could be down or the central site could be busy communicating with another remote unit. The viewer may have had the telephone receiver off the hook when the remote unit tried to call, etc.

Programming is such that if the remote unit makes a successful connection with the central site which then becomes aborted for some reason, it will hang up and wait some preselected time, such as three hours, before retrying. Possible reasons for this happening include the central site going down or the viewer lifting his telephone receiver during the local call in period.

Once the remote unit enters the call in cycle, it will continue to retry every three hours until it makes a successful telephone connection and has communicated successfully with the central site, transmitting the data stored in the RAM 34. The remote unit will, in any event however, continue to collect cable converter data as long as the local memory has not been filled.

The television viewer data collection system in accordance with the present invention contains a unique feature in which viewer qualitative reaction to programming, or specific viewer identification, or other like data can be collected and logged for transmission to the central location. Specifically, when the switches 23 or 27 in the viewer control units 20 and 21 are set to the on state, then the channel selected by the cable converters 18 and 19 for display on the associated television broadcast receivers 16 and 17 are those manually selected by the viewer by the channel select switches 22 and 26. However, if the switches 23 or 27 are set to the channel lock position, then cable converters 18 and 19 remain tuned to the channel already selected, despite any further changes of state of the channel select switches 22 and 26. However, the subsequent changes in the channel select switches 22 and 26 are stored as events in the RAM memory 34, along with the fact that the switches 23 and 27 were in the channel lock position. Thus, this feature is useful in storing data relating to viewer qualitative rating of a program, individual identification of a viewer within a household, to indicate that a viewer was utilizing the television broadcast receiver for playing a video game or the like, and any other like kind of information. Specific interpretation of this data of course depends upon interpretation at the central location as to what various channel select entries mean or how they are to be interpreted when the units are in the channel lock condition.

The hardware at the central location 13 may range in accordance with different applications of the invention from a simple asynchronous ASCII terminal to a large sophisticated computer installation. The central site must be capable of controlling an appropriate modem, including controlling the half-duplex line. Checking the operation of any one remote unit requires only a modem and an asynchronous ASCII terminal. Of course any serious automatic data logging application for monitoring a plurality of remote units will require a central site consisting of one or more auto-answer modems and an on-line computer with sufficient auxiliary storage to record at least the data generated in a predetermined period, i.e. 24 hours, by all the remote units in the system.

Figure 2:
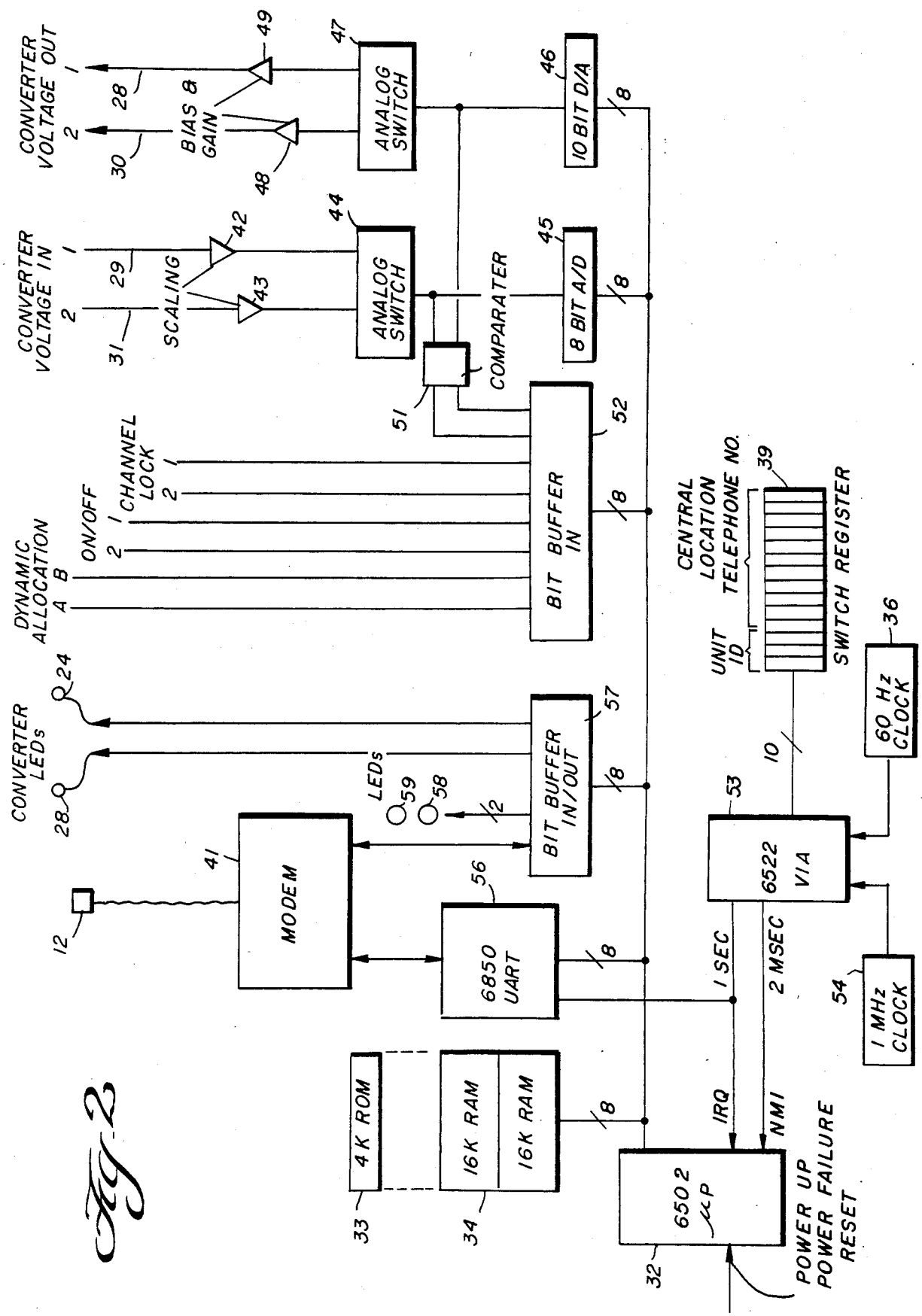
FIG. 2 is a more detailed block diagram of the circuitry of the remote unit.

Turning now to FIG. 2, there is shown a more detailed block diagram of the components of the remote unit 11. As shown in FIG. 2, the read signal path with respect to channel selection from the converters 1 and 2 along the signal lines 29 and 31 are passed through scaling amplifiers 42 and 43 into an analog switch 44. The analog switch 44 functions to switch between the read signal paths for converters 1 and 2. The output of the analog switch 44 feeds an 8 bit analog to digital converter 45 which communicates with the microprocessor 32.

Control information from the microprocessor 32 passes through a ten bit digital to analog converter 46 and from there is switched by an analog switch 47 through bias and gain amplifiers 48 and 49 to the control signal lines 28 and 30 for converters 1 and 2. A comparator 51 is provided interconnected between the output of analog switch 44 and the input of analog switch 47 and coupled to a bit buffer in circuit 52. The purpose of the comparator 51 is to enable achieving a ten bit read input to the microprocessor 32 utilizing only an 8 bit analog to digital converter 45. This is achieved by comparing the voltage levels of the output of the ten bit digital analog converter 46 with the voltage level of the input to the analog digital converter 45 and in adjusting the voltage level output of the analog switch 44 until a comparison of that voltage level with the voltage level output of the digital to analog converter 46 are equal.

The bit buffer in circuit 52 also buffers the inputs from the channel select and on off functions of the switches on the viewer controls 20 and 21. The bit buffer in circuit 52 is also shown as receiving dynamic allocation trigger inputs A and B. These dynamic allocation trigger inputs are useful in connection with effecting substitute program channel selection for market research purposes and the like, and the specific embodiment of the invention utilizing such dynamic allocation will be described hereinafter.

Returning to a description of FIG. 2, the 60 hz clock 36 is input to a countdown circuit 53 for achieving a 1 second clock output for time of day indications. A 1 MHz clock 54 is provided also connected to the integrated circuit 53 for achieving a two milisecond timing output signal. The integrated circuit 53 may be that known by the number 6522.

The microprocessor 32 in accordance with one embodiment of the invention is formed of a eight-bit Mostec 6502 and the timing outputs of integrated circuit 53 are shown as coupled to the IRQ and NMI interrupts to microprocessor 32. As shown in FIG. 2, power up or power failure functions of the remote unit are coupled to the reset interrupt of microprocessor 32.

A universal asynchronous receiver transmitter 56 is provided for coupling the microprocessor 32 to the modem 41. In accordance with one embodiment of the invention, this UART 56 can be a Motorola integrated circuit number 6850.

A bit buffer in/out circuit 57 is also provided in connection with control of the modem 41. If desired, light emitting diodes 58 and 59 may be provided mounted at some convenient location on the remote unit itself for monitoring operation of the unit in terms of communication with the central location, and the light emitting diodes can be driven by the bit buffer 57. Likewise, the bit buffer 57 can drive light emitting diodes 24 and 28 mounted on the viewer control units for the cable converters.

Returning now to a description of the dynamic allocation feature of the present invention, in accordance with one embodiment of the invention, dynamic allocation or substitute programming information is downloaded from the central location into a table contained in the memory 34 during the periodic communication between each remote unit and the central location. This table contains information that at a preselected time, the cable converters are tuned, under control of the microprocessor 32 to a preselected channel containing substitute programming. In this fashion, market research can be conducted by, for example, displaying one version of a commercial to part of the panelists or viewers and displaying another version of the commercial to a different group of panelists. By subsequently coordinating or correlating purchase decisions by these two groups of panelists, the efficacy of a particular version of a commercial can be evaluated.

The timing of the dynamic allocation can be achieved in one of two fashions. First, the precise time of day that the substitute programming is to be effected can be downloaded into the memory 34 during communication with the central location. Alternatively, trigger signals can be encoded on the cable signal coming into the converters for timing the substitute programming or dynamic allocation. In this alternative embodiment, a simple receiver for the trigger signals is coupled to the cable signals coming into the converters and drives the dynamic allocation trigger signals A and B shown in FIG. 2 as coupled into the bit buffer 52.

Figure 3:
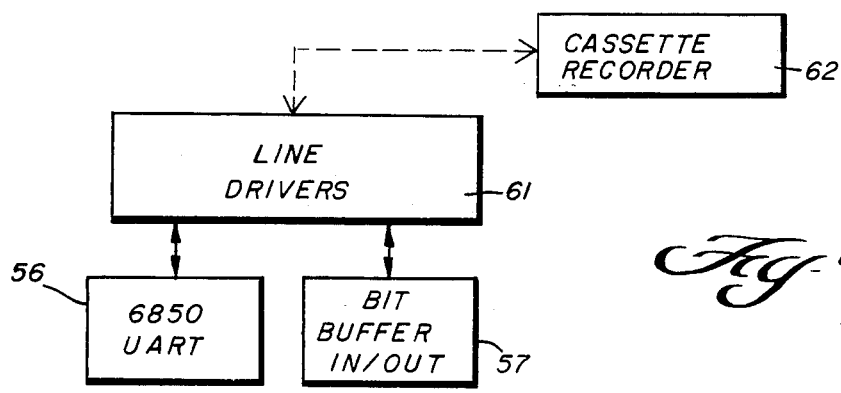

Turning now to FIG. 3, there is shown a block diagram of an alternate embodiment of the invention, in which no telephone communications between the remote unit and the central location are relied upon. Instead, the modem in the remote unit is replaced by suitable line drivers 61. Then, periodically, each remote location is visited for data collection and a cassette recorder or the like is coupled to the line drivers with the contents of memory 34 as to channel selection, time of day, channel lock status, qualitative viewer reaction data, etc. is transferred to the cassette recorder 62. Likewise, dynamic allocation data can be transferred from the cassette recorder 62 through line driver 61 for storage in the memory 34 for controlling substitute programming under control of the microprocessor.

Figure 4:
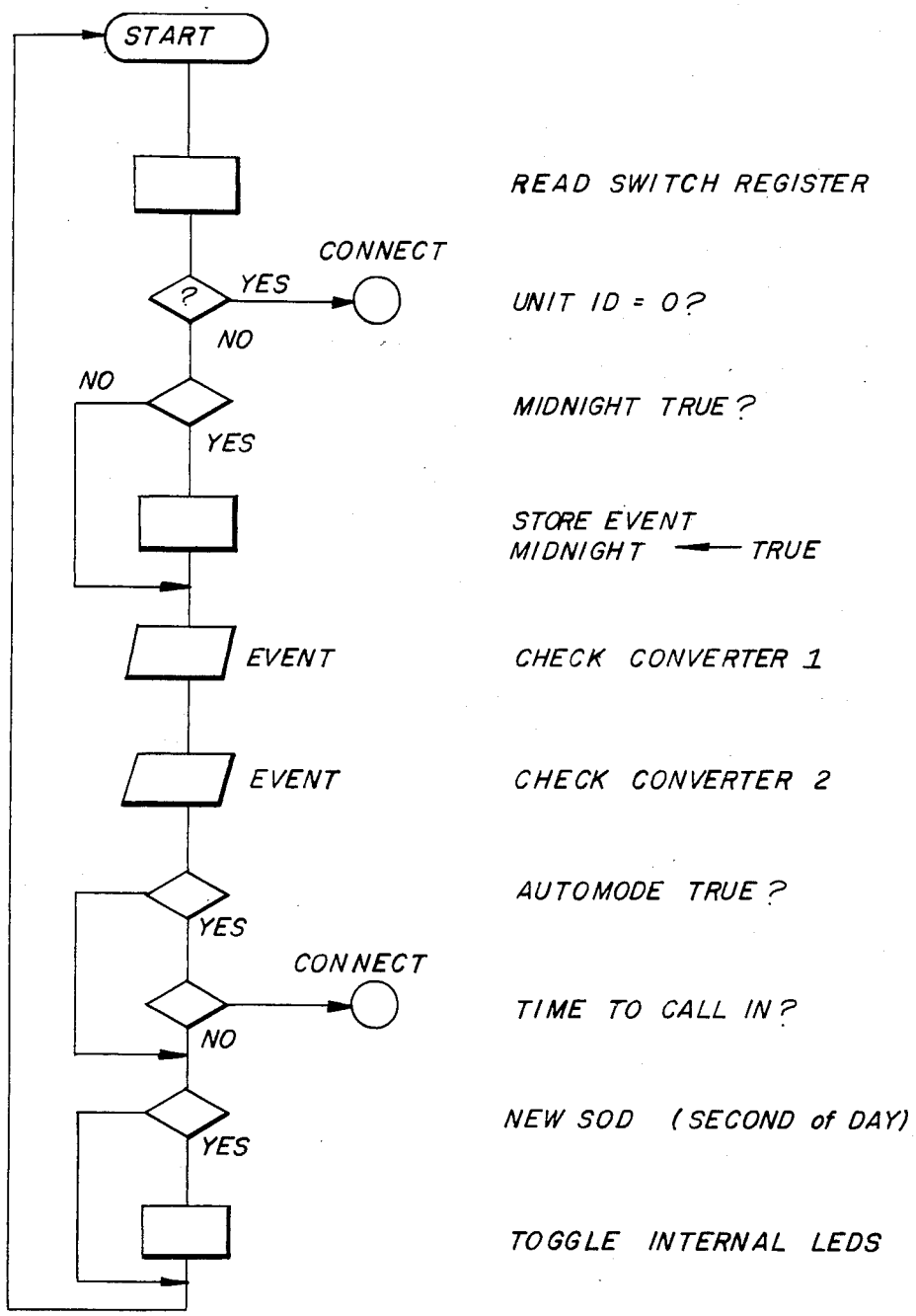
FIG. 4 is a logic flow diagram of the operation of the main software routine of the remote unit.

Turning now to FIG. 4, there is shown a logic flow diagram of the main logic loop of the remote unit. The first step is to read the switch register 39. If the unit i.d. number is set to zero, the unit enters a connect subroutine for dialing up the central location. This feature can be of value in for example forcing the unit to transmit any data it might be holding prior to removing it from a viewer's home. It is also useful for checking the operation of a remote unit at the central site. This of course means that no unit may have an i.d. number of zero. The next step in the loop is to determine whether a midnight true condition exists. If it is midnight, then an event is stored as midnight true.

Next, the remote unit enters an event subroutine for checking converter 1 followed by another event subroutine for checking converter 2.

The next logic decision is with respect to whether or not the unit is programmed in an automode state. In an automode state, the remote units are programmed to initiate telephone communications with the central location and transmit any data stored in memory 34 to the central location. If the unit is not set in automode, the unit will not initiate such telephone communications. if an automode true condition exists, the next decision is as to whether or not it is time for the unit to call in. If it is the preselected time assigned to the particular remote unit for initiating telephone communications with the central location, a connect subroutine is entered.

The next decision block is to whether or not it is a new second of day. If it is not, the main loop is repeated. If it is a new second of day, in accordance with one embodiment of the invention the light emitting diodes 58 and 59 provided on the remote unit are toggled.

Figure 5:
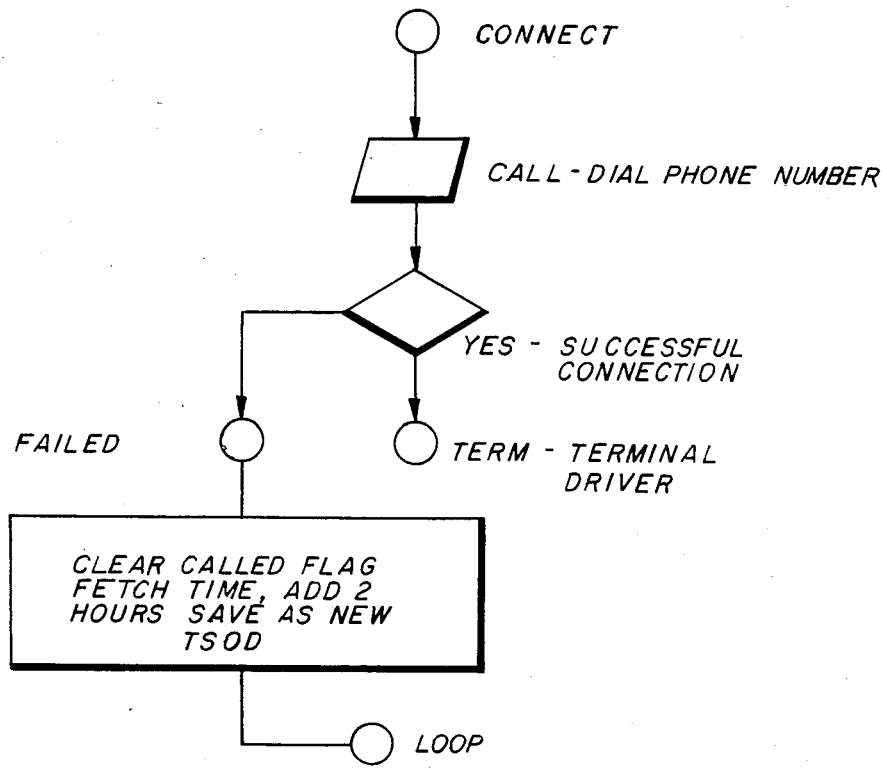
FIG. 5 is a logic flow diagram of the connect subroutine of the remote unit.

Turning now to FIG. 5, there is illustrated the connect subroutine. The first step in the connect subroutine is for the unit to dial the phone number of the central location. If there is a successful connection, a terminal driver conditioning exists in which the remote unit will accept and respond to commands from the central site or location. If there is a failure of successful connection with the central location, the called flag in the software is cleared, two hours (or any selected amount of time) is added, and the new time is saved as a new trap second of day. Thus, a new call in time to the central location for the unit is defined as being some predetermined later time, such as three hours later.

Figure 6:
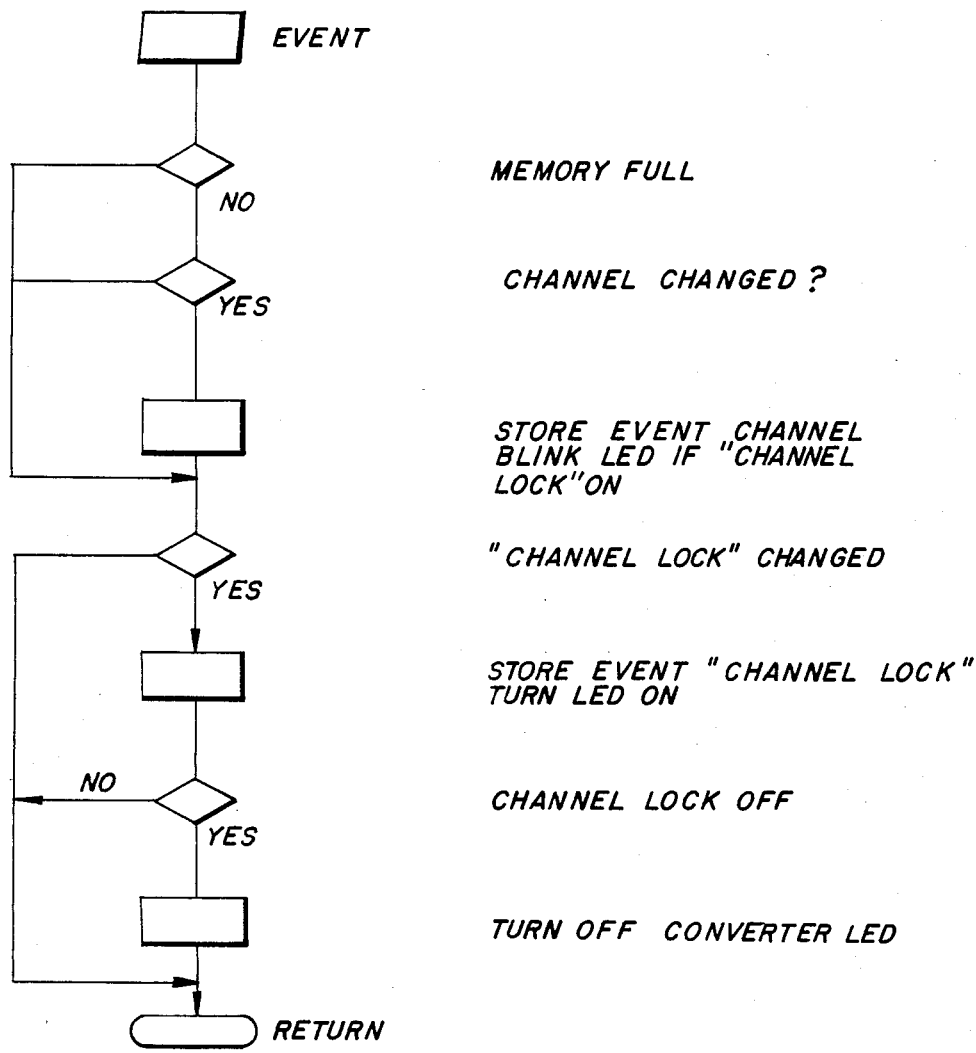
FIG. 6 is a logic flow diagram of the event subroutine of the remote unit.

Turning now to FIG. 6, there is shown the logic flow diagram for the event subroutine. The first decision is whether or not the memory is full, this referring to the data memory 34. If the memory is not full, then a decision is made as to whether the channel has changed. If the channel has changed, the channel change is stored as an event. Next, a decision is made as to whether the channel lock condition has changed. If it has, an event is stored as appropriate as either an entry or exit from channel lock. The LED is controlled when in channel lock such that the LED is turned on whenever the unit is in channel lock. Each time an event is stored when the unit is in channel lock, the LED blinks off for approximately 1 second to indicate to the viewer that the unit has captured an event while in channel lock.

Figure 7:
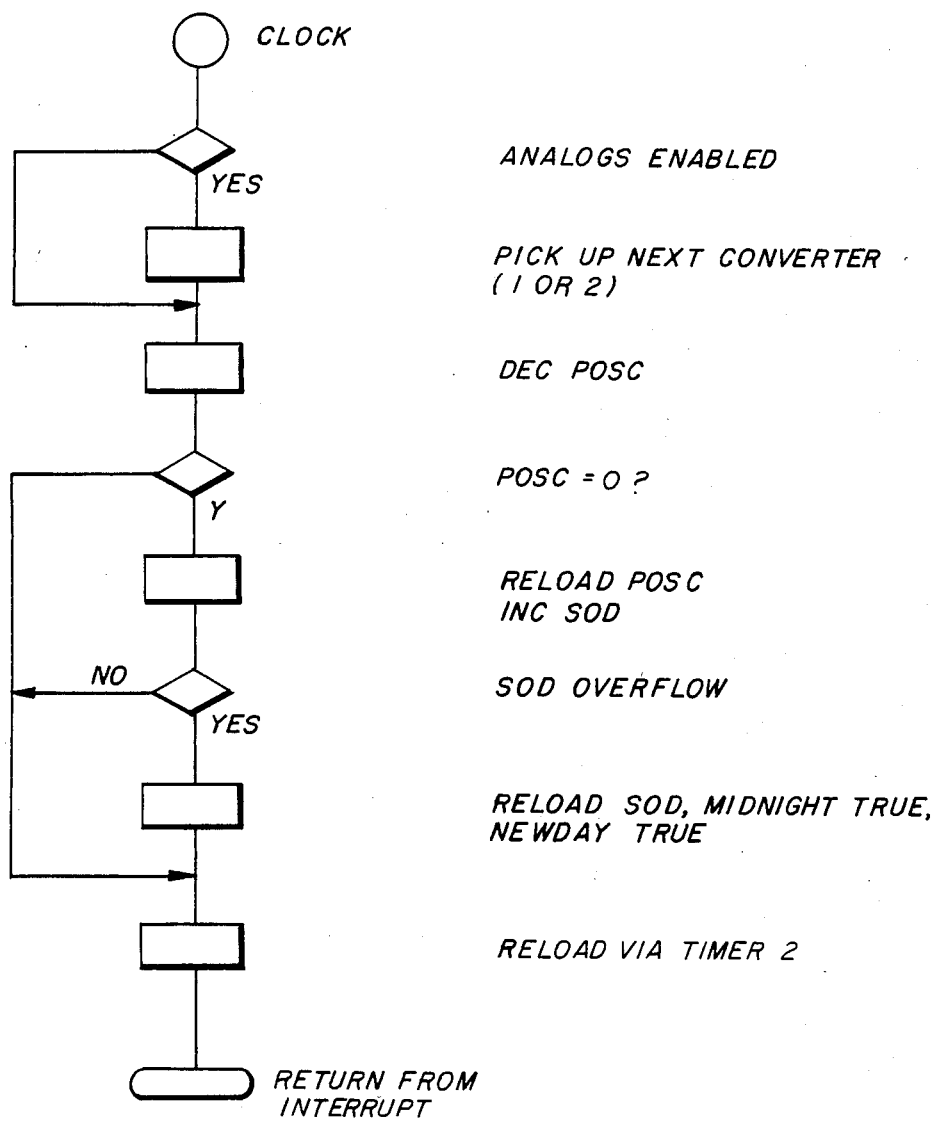
FIG. 7 is a logic flow diagram of the clock subroutine of the remote unit.

Turning now to FIG. 7, there is shown a clock subroutine of the remote unit. The clock subroutine is essentially an interrupt driven by the 60 hz powerline through the VIA countdown circuit 53. In accordance with this specific embodiment of the invention, the minimum rate is 1 hz, and the maximum rate is 20 hz. The clock routine updates the second of day and checks for the end of day. The clock routine also calls the analog routines and alternates converters on each interrupt through the analog switches 44 and 47.

The first decision block in the clock subroutine is whether or not the analogs are enabled. This refers to the analog to digital converter 45 and the digital to analog converter 46. If these are enabled, it means the unit is in a condition for checking the cable converter status. These digital to analog and analog to digital converters can be disabled for functional checks and the like on operation of the remote unit. If the analogs are enabled, the next decision is to pick up the next converter, either converter 1 or converter 2 under control of the analog switches 44 and 47. The next control block is described as DEC posc, referring to decrementing the part of second counter. This refers to how often the remote unit looks at the converters. For example, if it is desired to have the converters monitored ten times a second, with a 60 hz timing scheme, 6 would be loaded into the part of second counter and then decremented. The next decision block refers to whether or not the part of second counter is equal to zero. If it is, then the part of second counter is reloaded, and the second of day is incremented by one. If the second of day counter does not overflow, then the VIA timer 53 is reloaded and there is a return from interrupt. The second of day counter is set at 86,400, this number corresponding to the number of seconds in a twenty-four hour day. Thus, if the second of day counter overflows, it means that it is midnight and a new day starts. The second of day counter is then reloaded, the VIA timer 53 is reloaded, and there is a return from interrupt.

The present invention has been described above in the context of a presently preferred embodiment. It should be clear to those skilled in this art that many changes or alterations may be made to the particularly disclosed embodiments without departing from the true spirit and scope of the invention.

We claim:

1. In a system for monitoring habits of cooperating television viewers or panelists, including a central location and a plurality of remote units at a plurality of panelist locations, a remote unit for connection to a television broadcast receiver comprising:
means for receiving a television broadcast signal;
a viewer control means including a channel selector and a channel lock switch actuable between channel lock and unlock positions and coupled to said means for receiving a television broadcast signal, said channel lock switch functioning in said channel lock position to lock the associated television broadcast receiver to the channel currently selected notwithstanding any subsequent changes in the channel selector;
a microprocessor;
first memory means for storing programming information for said microprocessor and second memory means for storing data;
timing means for generating time of day information;
means for coupling said viewer control means through said microprocessor to the television broadcast receiver, said microprocessor functioning to monitor changes in said channel selector and the state of said channel lock switch and to store same, together with time of day information, in said second memory means, changes in said channel selector while said channel lock switch is in the unlock position being stored as channel viewing data and changes in said channel selector while said channel lock switch is in the lock position being stored as one of viewer reaction and viewer identification data;
a modem for connection of the non-dedicated telephone network, said modem being coupled to and under the control of said microprocessor; 
register means for setting a unique identification signal for each remote unit, each such unique identification signal corresponding to a preselected unique call-in time for each such remote unit;
said microprocessor functioning to establish communication through said modem with the central location at the preselected unique call-in time and to transmit the data stored in said second memory means to the central location; and
wherein said second memory means includes a channel substitution table and wherein the contents of said channel substitution table are down loaded from the central location to the remote unit during communication at said unique call-in time, said microprocessor controlling channel selection to effect substitute channel selection at preselected times in accordance with said channel substitution table regardless of the manually viewer selected channel.

2. A remote unit in accordance with claim 1 wherein said means for receiving a television broadcast signal comprises a cable converter.

3. A remote unit in accordance with claim 1 wherein said channel substitution table includes preselected time of day information for said substitute channel selection, and wherein said microprocessor effects the substitute channel selection in accordance with the preselected time of day information.

4. A remote unit in accordance with claim 1 which includes a control signal detector means coupled to said means for receiving a television broadcast signal for detecting a control signal contained within said television broadcast signal, and wherein substitute channel selection is effected at preselected times corresponding to occurrence of the control signal in the television broadcast signal.

* * * * *